April 30, 1940. H. W. RICHTER 2,198,634
MOLDING APPARATUS
Filed May 25, 1934 2 Sheets-Sheet 1

INVENTOR.
HERMAN W. RICHTER
BY Charles W. Rivise
A. D. Caesar
ATTORNEYS

April 30, 1940.  H. W. RICHTER  2,198,634

MOLDING APPARATUS

Filed May 25, 1934  2 Sheets-Sheet 2

INVENTOR.
HERMAN W. RICHTER
BY Charles W. Rivise
A. D. Caesar
ATTORNEYS

Patented Apr. 30, 1940

2,198,634

UNITED STATES PATENT OFFICE 2,198,634

MOLDING APPARATUS

Herman William Richter, Bridgewater, Mass.

Application May 25, 1934, Serial No. 727,544

2 Claims. (Cl. 92—59)

This application is a continuation in part of application Serial No. 638,603 filed October 19, 1932. The disclosure and claims of said application are directed to a shoe heel molded from fibrous pulp and to a method of making said article.

The present invention relates to the production of molds for the manufacture of shoe heels from fibrous pulp and other plastic materials.

Heretofore, many attempts have been made to place the manufacture of molded shoe heels on a commercial basis. (Reference is had to true heels of the type exemplified by the wooden heel of commerce rather than by the so-called rubber "heel," which is a "top-lift" rather than a true heel.) Many patents for molded heel compositions have been granted. Elaborate machines for molding heels, some of them marvels of ingenuity, have been devised; but the rock on which most of these ventures came to grief was the mold. In many cases it was a complicated affair; and always it had to be machined from solid metal, a very expensive process. Heels of different heights and sizes required different molds. The style problem still further increased the number of molds needed for production. It was a discouraging task to equip a plant with even the molds necessary for the most limited line of heels. When it is realized that styles change rapidly, the mold problem, viewed from the conventional angle, becomes a hopeless one, and this in large measure accounts for the fact that the wood heel still dominates the market. This is so, in spite of the fact that it should be possible to produce a satisfactory molded heel having many advantages, including lower cost, over the conventional wooden article.

A primary object of the invention is to provide a novel form of mold for heels which is relatively simple in construction and which can be made economically and rapidly on a commercial scale.

Another object is to provide a mold which will readily discharge the molded article without danger of injury thereto.

In its very essence, the mold of the invention comprises two mating sections mounted for pivotal movement toward and away from each other, each section being provided with a complemental portion of a mold cavity, said mold cavity having a concave breast portion for the formation of the concave breast of the heel to be formed therein, said concave breast portion of the mold cavity being formed on the side of the mold cavity which is adjacent the point of pivot of said two mating sections, the distance from said point of pivot to said concave breast portion of the mold cavity being less than the radius of curvature of said concave breast portion of the mold cavity.

In the preferred embodiment of the invention, the mold is in the form of a hollow shell provided with a lining having impressed therein the contour of the mold cavity or matrix. The lining is preferably of a readily fusible metal or alloy so that it can easily be "sweated out" or removed by the heat of an oxyacetylene blow torch. Such a lining can be easily replaced whenever deemed necessary or desirable by either a duplicate lining or by one having a mold cavity of different contour. Hence, the cost of making replacements or changes in the matrix of the mold is greatly decreased. Furthermore, it is possible by the use of a relatively small number of standard mold shells to produce a large variety of styles, shapes and sizes of heels.

The invention will now be described in detail with the aid of the accompanying drawings, wherein.

Figure 1:
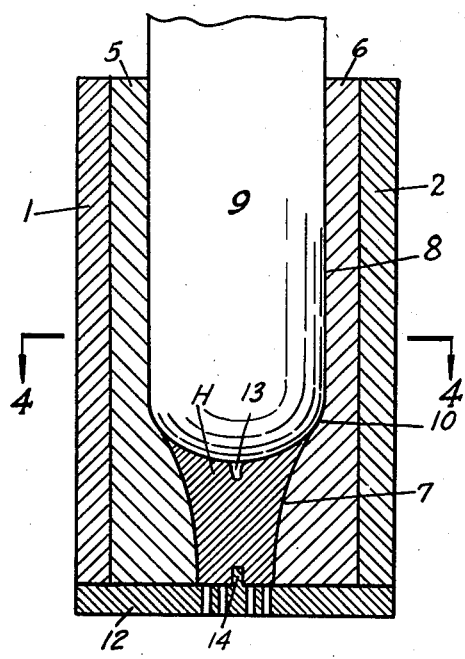
Figure 1 is a vertical cross-section through a preferred embodiment of molding device and showing the plunger in its lowermost position.
Figure 2:
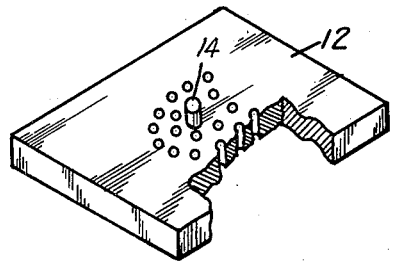
Figure 2 is a perspective view of the foraminous or perforated bottom plate of the matrix.
Figure 3:
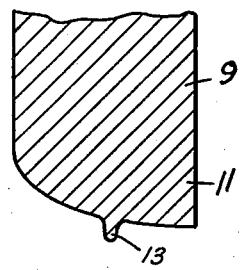
Figure 3 is a vertical cross-sectional view of the lower end of the plunger taken at right angles to that of Figure 1.
Figure 4:
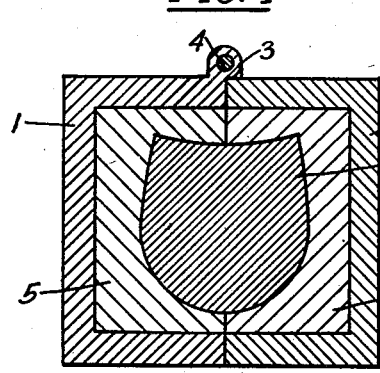
Figure 4 is a cross-sectional view taken along line 4—4 of Figure 1.
Figure 5:
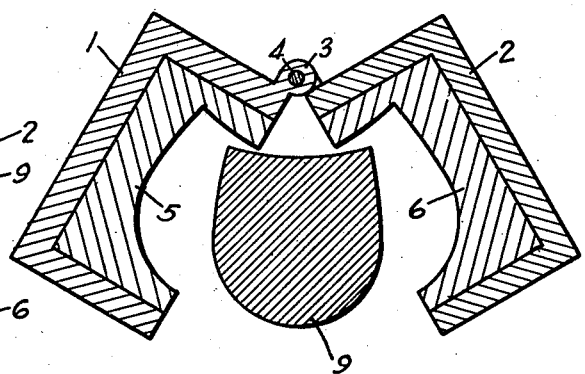
Figure 5 is a view similar to Figure 4 but showing the mold in the process of being opened.
Figure 8:
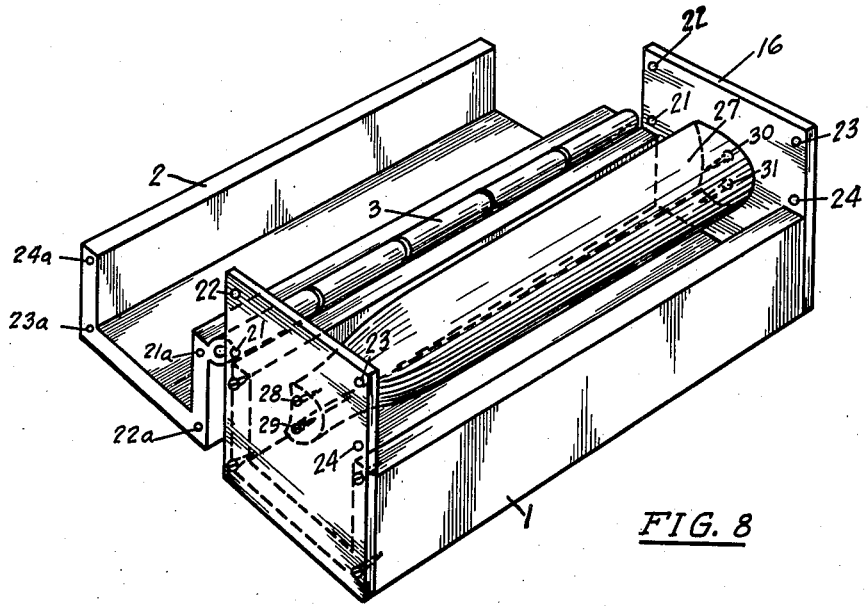
Figure 7:
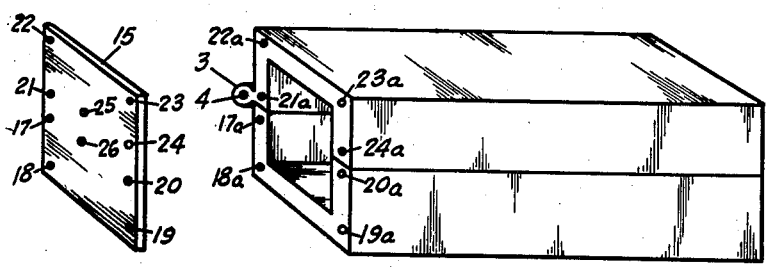
Figure 7:
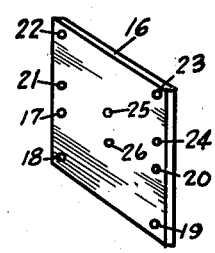

Figure 7 is a perspective view of the outer shell of the mold in closed position together with the end plates used in closing the ends of the shell when it is used for molding the lining of the mold, the end plates being shown somewhat spaced from the ends of the shell for clearness of illustration; and Figure 8 is a perspective view of the assembled mold shell, end plates and core in position for the pouring or casting of the mold lining.

Referring to the drawings in greater detail and particularly to Figures 1 to 5 thereof, the reference characters 1 and 2 designate the two mating sections of the outer shell of a "clam shell" type of mold hinged together by means of the hinge 3 and hinge pin 4. Each of the shell sections 1 and 2 may advantageously be U-shaped in cross-section with inner and outer rectangular corners. Each section of the mold shell is provided with a closely fitting lining as indicated at 5, 6. The two lining sections 5 and 6 are provided with complementary portions of a central cavity which consists of a lower or matrix portion 7 and an upper or reservoir portion 8. The matrix 7 is in the form of the article to be molded and is slightly larger than the article while the cross-section of the reservoir 8 is preferably similar to that of the top of the article to be molded in order to accommodate the plunger 9 which is of similar uniform cross-section. The junction 10 between the matrix 7 and the reservoir 8 forms a seat for the plunger 9 in its lowermost position at which point it has just completed its function of compacting the plastic material in the matrix. The bottom 11 of the plunger is of a shape to impart the desired configuration to the top of the article being molded. In the case of a shoe heel, the bottom of the plunger may be of exactly the same shape as that of the heel seat of the shoe for which the heel is intended so that the shoe heel is formed with a dished or concaved upper portion. In this way I can obviate the use of the conventional rand.

It is to be noted at this point that the matrix or mold cavity 7 is provided with a concave breast portion for the formation of the breast portion of the heel to be molded, that the breast portion is formed on the side of the mold cavity which is adjacent the hinge 3 of the two mating sections 1 and 2, and that the distance from the point of pivot to the concave breast portion of the mold cavity is less than the radius of curvature of the concave breast portion of the mold cavity. It is also to be noted that the junctions of the mating sections of the mold lie in a plane which bisects and is normal to the breast portion of the mold cavity, and that each of the complemental portions of the mold cavity corresponds to a vertical half of the heel to be molded.

The numeral 12 designates a foraminous or perforated plate of the matrix. I have found it unnecessary to provide perforations about the vertical faces of the mold cavity, for the perforations in the bottom plate are sufficient to allow the drainage of all the water that can be forced out of the plastic material during the compacting operation. Both the bottom 11 of the plunger 9 and the upper surface of the foraminous plate 12 may be provided with the cooperating projections or protuberances 13 and 14 respectively for a purpose to be later brought out.

The pulp reservoir of the mold may advantageously be of such capacity as to permit the introduction at one time of a quantity of plastic material which bears a definite predetermined ratio to the total amount of plastic material necessary to produce a heel of desired dry weight. The ratio may well be 1:1 in which case it will be possible to introduce at one time a sufficient quantity of plastic material to produce the entire heel blank. The necessary capacity in the case of a pulp slurry depends upon a number of factors including the freeness of the pulp, its concentration and the amount of water which can drain through the foraminous plate 12 during the time it takes to pour the entire molding charge into the mold cavity. The theoretical total height of the mold cavity to form a heel blank of twenty-three grams dry weight before the subsequent impregnation disclosed in my prior application from a pulp slurry of one per cent concentration is about 44 inches, but due to the drainage through the perforated plate 12, the actual height need only be about thirty inches. It is well to allow a small margin for possible variations in "freeness" of the pulp. It can be seen from the foregoing that the weight of the dry heel blank can readily be controlled within narrow limits. The weight is of considerable importance as it is an index of the density of the heel and gives a clue as to the permeability of the mass by the indurating compound subsequently used. It is also of importance from the standpoint of use requirements, for a heel should not be too heavy. On the other hand, heels should not be molded with too little stock in them, for such blanks are rather more easily deformed during removal from the mold and shrink to a somewhat greater extent during drying and induration.

Figure 6:
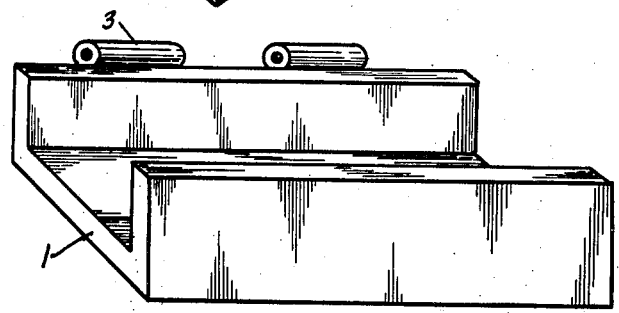
Figure 6 is a perspective view of the casting constituting one-half of the outer shell of the mold.

There are several ways in which the mold may be made. The mold shell may be made by casting, forging or machining each section out of suitable metals or alloys such as iron or steel. I prefer to cast the mold shells out of iron or steel; one shell pattern being sufficient for the production of all the mold shells in the establishment. A typical rough casting of one-half of this mold shell is shown in Figure 6. Machine work necessary to fit the rough castings for subsequent use are within the skill of a mechanic and need not be described. The two machined halves of the shell are clamped together and the holes for the hinge pin drilled. With the insertion of the hinge pin 4, the mold shell is complete (see Figure 7).

The lining may be made in any one of a number of ways and then inserted into the mold shell and united thereto in any desired manner. One way would be to engrave suitable dies and then to die cast each of the lining sections therein. Another way consists in casting or forging the lining sections roughly to shape and then machining their cavity surfaces to the exact contour design desired. I, however, prefer the following technique as being less laborious, less time consuming and much less expensive.

Stated in broad general terms, my preferred technique consists in casting a section of the mold lining in situ in each of the mold shell sections. More specifically I proceed as follows:

Plates 15 and 16 are made out of heavy gauge steel (3/16" or over) for the ends of the mold shell. These plates are shown in Figure 7. Each plate is provided with three series of holes, 17 to 20 inclusive; 21 to 24 inclusive; and 25 and 26. The series of holes 17 to 20 inclusive line up with one of the mold shells, while the series 21 to 24 inclusive line up with the other mold shell. The holes 25 and 26 are on the vertical center line of the plate and are equally spaced from the horizontal center line. Produced in quantities, these plates are made and drilled by template which assures perfect uniformity. The ends of the mold shells are provided in any desired manner with the series of holes 17a to 20a inclusive and 21a to 24a inclusive to correspond with the two series 71 to 20 inclusive and 21 to 24 inclusive so that the plates 15 and 16 can be united to the ends of the mold shell by means of screws.

The next step is to produce the cast-iron pattern 27, which obviously must be of such shape and size as to exactly fit into the mold cavity of the finished mold. To produce this pattern, I first fashion a wooden pattern exactly similar to the plunger 9, which, as has been stated, serves to compact the plastic material. To the lower end of this pattern I unite in any suitable manner the heel to be reproduced. The vertical cross-section of this composite structure is similar to that of the plunger 9 and heel H shown in Figure 1. From the wooden plunger-heel pattern I make an iron casting by conventional methods. This casting is machined to the exact size and to a length corresponding to the distance between the ends of the mold shell, after which it is highly polished and assembled with the mold shell as shown in Figure 8.

Referring more particularly to Figure 8 it will be noted that the cast-iron core 27 is secured by means of the two sets of screws 28, 29 and 30, 31 to the end plates 15 and 16, which end plates are in turn secured to one of the mold shell sections 1. The other mold section 2 is swung out of the way. It is to be particularly noted that the holes 25 and 26 are so positioned in the end plates that the plane of the upper faces of the mold shell 1 exactly bisects the core 27 longitudinally. Into the space between the core 27 and the mold shell 1 the metal for the lining is poured. The end plates 15 and 16 prevent the escape of the metal through the ends of the mold shell. If thought necessary or desirable, dams may be provided to prevent overflowing of the metal.

When the poured metal has cooled, the screws holding the end plates in place are removed and the core 27 still carrying the end plates is tapped out and transferred to the other section 2 of the mold shell. The process is then repeated. The two sections of the mold are then separated by driving out the hinge pin 4 and the linings machined down flush to the faces of the mold shells.

Ordinary Babbitt metal may be used for the lining and will give fair service in molding heels out of the material disclosed in my prior application, but even better results, especially from the standpoint of wear, may be obtained by using the harder alloys. When a mold shows signs of wear or it is desired to change the contour of the mold cavity, it is a simple matter to "sweat out" the fusible metal by means of the oxy-acetylene torch.

Retention of the liner may be promoted by slightly "undercutting" the mold shell, as is done in dentistry to promote the retention of fillings; or screws may be inserted at several points in the mold and the metal cast around them.

From the foregoing description it is evident that the mold shell lends itself readily for use as a standardized piece of equipment that can, by suitably varying the character of its lining, be employed for the production of any type, style or size of heel. In equipping a factory for the molding of heels by my improved technique; I provide a number of these mold shells.

In using the apparatus, the plunger 9 is raised out of the way and the molding charge is introduced into the mold cavity. Since it is possible to pour the slurry in the same manner and at the same rate each time, the necessary amount of slurry to produce a heel of desired dry weight can be left to the judgment of the operator, but obviously suitable measuring devices may be used. After the entire charge has been introduced, the plunger is moved to its lowest position; i. e., the seat 10 thus compacting the pulp in the matrix 7. During the molding operation the molding apparatus may be heated in any suitable manner, as for instance by being inserted in an oven. When the molding operation has been completed, the mold is opened by moving the two mold sections 1 and 2 about the pivot or hinge 3. Finally the plunger is raised and the article removed. As can be readily seen from an examination of Figures 4 and 5, the distance from the pivot 3 to the breast of the heel is less than the radius of curvature of the heel breast and the distance from the pivot 3 to the outer curved edge of the heel is greater than the radius of curvature of the curved outer edge of the heel so that when the mold is opened by swinging the two mating mold members 1 and 2 outwardly, the mold immediately breaks away from the molded heel blank. Furthermore, as can be seen from Figure 1, the article is clamped and held steady between the cooperating projections 13 and 14. Hence, the possibility of damaging the article during the opening of the mold is reduced to a minimum.

The foregoing constitutes the essential and distinct thought of my invention, but it will be understood that the details thereof may be varied or combined with various other details without affecting the peculiar results obtained.

I claim:

1. A mold for concave breast shoe heels, said mold comprising two mating sections mounted for pivotal movement toward and away from each other, each section being provided with a complemental portion of a mold cavity, said mold cavity having a concave breast portion for the formation of the concave breast of the heel to be formed therein, said concave breast portion of the mold cavity being formed on the side of the mold cavity which is adjacent the point of pivot of said two mating sections, the distance from said point of pivot to said concave breast portion of the mold cavity being less than the radius of curvature of said concave breast portion of the mold cavity.

2. A mold for concave breast shoe heels, said mold comprising two mating sections mounted for pivotal movement toward and away from each other, each of said sections being hollow and being provided with a removable lining, the lining in each section being provided with a complemental portion of a mold cavity, said mold cavity having a concave breast portion for the formation of the concave breast of the heel to be formed therein, said concave breast portion of the mold cavity being formed on the side of the mold cavity which is adjacent the point of pivot of said two mating sections, the distance from said point of pivot to said concave breast portion of the mold cavity being less than the radius of curvature of said concave breast portion of the mold cavity.

HERMAN WILLIAM RICHTER.